June 9, 1931. E. E. CULBERTSON 1,809,404
CONNECTION FOR UNIVERSAL JOINTS OR COUPLINGS
Filed April 10, 1926 2 Sheets-Sheet 1
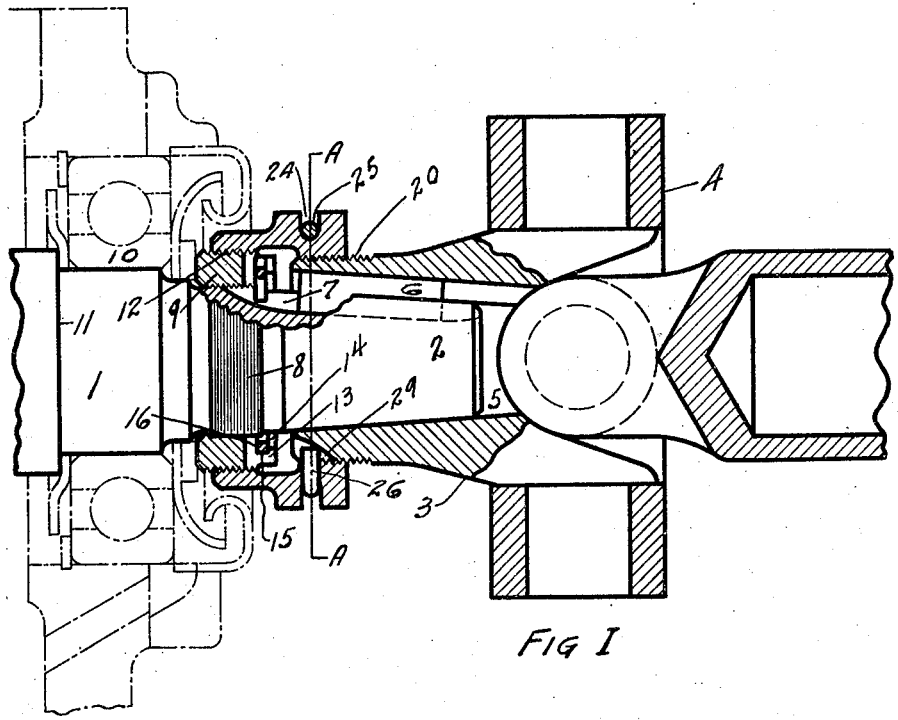
FIG I
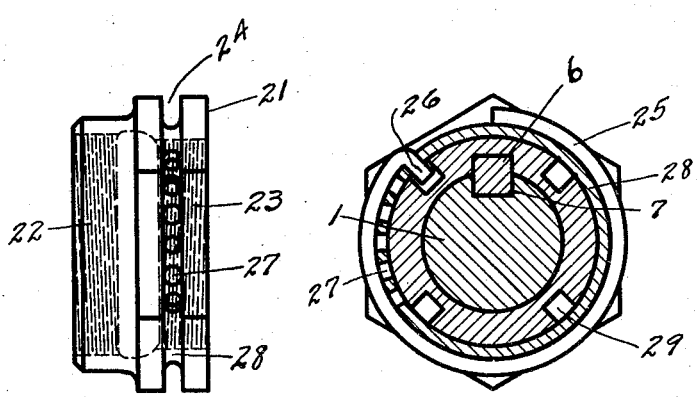
FIG II  FIG III
E. ESTAY CULBERTSON
INVENTOR
ATTORNEYS.

June 9, 1931.  E. E. CULBERTSON  1,809,404
CONNECTION FOR UNIVERSAL JOINTS OR COUPLINGS
Filed April 10, 1926   2 Sheets-Sheet 2
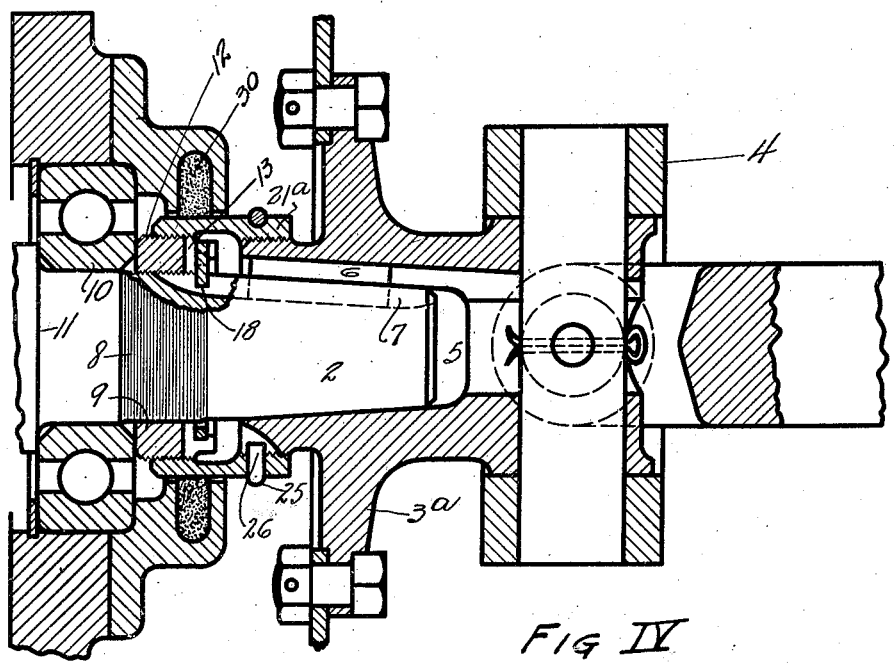
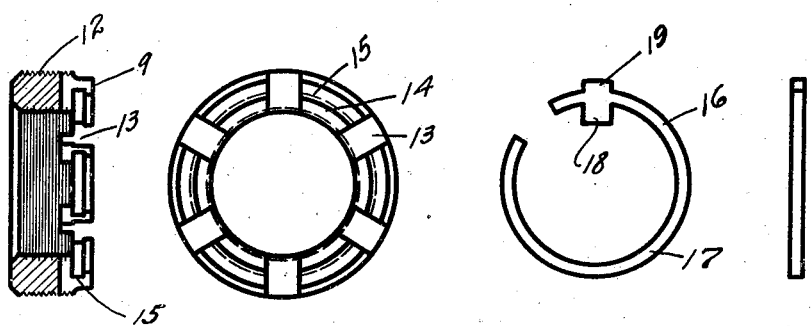
E. ESTAY CULBERTSON
INVENTOR.
BY
Whittemore Hulbert Whittemore & Belknap
ATTORNEY.

Patented June 9, 1931

1,809,404

UNITED STATES PATENT OFFICE

E. ESTAY CULBERTSON, OF DETROIT, MICHIGAN, ASSIGNOR TO SPICER MANUFACTURING CORPORATION, A CORPORATION OF VIRGINIA

CONNECTION FOR UNIVERSAL JOINTS OR COUPLINGS

Application filed April 10, 1926. Serial No. 101,147.

The invention relates to universal joints or couplings, particularly those used in the transmission of power in automobiles.

The principal object of the invention is to provide an improved method for securing the hub of a coupling or joint to a power transmitting shaft whereby the flanges and screws which are employed conventionally at present for this purpose will be eliminated.

The advantages created by this elimination through the invention are:

1. Transmission of the entire torque load from the shaft to the joint proper, or vice versa, direct instead of through screws.

2. Shortening of the distance from the bearing which supports the hub end of the power shaft to the center of the joint or coupling, which distance is commonly termed "overhang" resulting in:

3. A subsequent reduction in the load caused by whipping carried on this bearing, permitting the employment of a smaller bearing or indefinitely prolonging the life of the same bearing.

4. A very pronounced reduction in the time required by the consumer to assemble the joint to its respective shaft; this operation, through the invention, being accomplished with much greater rapidity and ease than present methods permit, resulting in a very marked reduction in its cost by the elimination of the screws and their locking means used at present.

5. Making possible an increase in the angle of operation within a shorter overhang than is possible with the flanges.

6. A keen reduction in the unit manufacturing cost resulting in a lower unit price to the consumer.

7. A simplifying of manufacturing processes eliminating certain tools with their subsequent upkeep costs.

8. Provides its own means for disengagement with the shaft through the expelling power of its opposed threads making the use of pullers, which are needed at present, unnecessary.

Reference to the drawings is made as follows:

Fig. I is a sectional longitudinal view through the center of a plain universal joint hub mounted upon a power shaft showing in section, also, the method of its connection thereto.

Fig. II is a side view of a hexagonally flanged connecting member for securing the joint hub to the shaft in parallel and telescopic relationship.

Fig. III is an end sectional view taken on line AA in Fig. I showing a method for rotatably securing the hub to the shaft and also a method for rotatably securing the connecting member to the hub.

Fig. IV is a sectional longitudinal view through the center of a hub employed in the construction where a propeller shaft brake is used.

Fig. V is a cross sectional view of the nut used for securing the shaft bearing against a retaining shoulder on the shaft and also facilitating engagement with the connecting member.

Fig. VI is a plan view of the nut in Fig. V.

Fig. VII is a plan view of the lock used for rotatably securing the nut to the shaft.

Fig. VIII is an end view of Fig. VII.

In Fig. I a portion of the end of a transmission is shown by the broken lines embracing a bearing used for supporting the end of the shaft and a method currently employed for retaining the lubricant within the case. 1 is a power shaft upon the end of which is a seat 2 for receiving the hub 3 of a universal joint 4; the hub 3 being made with a hole 5 corresponding in shape to the seat portion 2 of the shaft. The seat 2 is provided with means for rotatably securing the hub thereto as by a key 6 which fits into a slot 7. Adjacent to the seat portion 2 of the shaft 1 is a threaded portion 8 with threads of right hand direction of lead for receiving a round nut 9 which secures the bearing 10 against a shoulder 11 of the shaft. This nut is also provided with threads 12 of right hand lead on its outer periphery and carrying a slot or series of slots 13 on its one side to facilitate the admission of a wrench. On this same side is a counterbored portion 14 having at its bottom a groove 15 for receiving a lock 16. The lock 16 is made of a resilient metal so that when assembled it is always under compression, thereby automatically retaining itself within the groove or making compression necessary for its release. This lock embraces a ring segment 17 having an inwardly extending tongue 18 which protrudes into the slot 7 within the shaft 1 and also an outwardly extending tongue 19 which fits into one of the slots 13 in the side of the nut.

In the art as disclosed on the drawings, which may differ in the details of its construction without departing from the spirit of the invention, the hub 3 of the coupling 4 is threaded on its outer end with threads 20 of left hand lead, or opposite in direction of lead to those on the outer periphery of the nut 9. A connecting member 21 having internal threads of right hand lead 22 in one end and internal threads of left hand lead 23 in the opposite end is used for permanently securing the hub 3 to the shaft 1 in parallel or telescopic relationship.

In assembling, for the convenience of preliminary retention, the member 21 is started over the threads of the hub or it may be started over the threads of the nut 9, which for practical purposes, suffices as well, and the hub then placed upon the shaft with the key registering in the slot. The member 21 is then turned in a right hand direction, and due to the right and left hand threads, the members 9 and 3 are pulled together or until the hub 3 is drawn tightly against its seat, after which the member 21 is locked to the hub 3 by the lock wire 25. This connecting member 21 is also provided with a groove 24 in its outer periphery for receiving a lock wire 25 for locking it to the hub 3 by means of a hooked end 26. This lock wire is then held in place through its initial diameter being smaller than that of the groove and, being made also of a resilient metal, holds itself tightly in the groove. This lock operates oppositely from the lock 16, being of the contracting type while the lock 16 is of the expanding type. A means is provided for adjustment in locking by a series of holes 27 drilled through the wall 28 of the member 21, the spacing of these holes making it necessary to turn the member 21 only a few degrees before the hook 26 of the lock wire 25 is able to enter one of the slots 29 in the end of the hub 3, thereby rotatably locking the members 3 and 21 together.

In Fig. 4 a portion of a housing is also shown with a slight difference in the design of its details. This also shows the method employed when a propeller shaft brake is used and differs from Fig. 1, excepting in foreign details, in the shape of the connecting member 21ª and the design of the hub 3ª which provides a flange for mounting the brake drum. In this case the member 21ª is made from round stock to facilitate the grinding of its outer diameter on centerless grinders in order to provide a smooth surface more economically for the wiper 30. This member is preferably provided with means, not shown, for permitting the employment of a wrench to effect turning and is otherwise identical to that described in Fig. 1.

The method disclosed provides a decidedly simple, yet very positive way for securing the hub to the shaft. It is particularly easy and inexpensive to assemble to other chassis units and results in a minimum distance from the bearing to the center of the joint, which results in a decreased load on the bearing due to the resultant decrease in whipping. The entire torque load is delivered directly to the hub and the elimination of screws and flanges ordinarily necessary is accomplished.

I have shown and described only one manner for effecting this union or securement, and am duly conscious of the fact that other ways may be employed in accomplishing the same end without departing from the area or spirit of the invention, and therefore do not wish to be confined strictly to the details as herein set forth, but to the intent as expressed in the claims as follows:

1. In a device of the character described, the combination with a shaft having a seat, of a ring threaded on said shaft adjacent said seat, and being externally threaded, means for locking said ring to said shaft, a hub mounted on said shaft and having threads, of opposite direction of lead to those on said ring, on its periphery, a coupling member having right and left hand internal threads adjacent its ends for engagement with the threads on said ring and hub, and means for locking said coupling member in operative position.

2. In a device of the character described, the combination with a shaft having a seat provided with a groove, of a ring threaded on said shaft adjacent said seat and being counter-bored adjacent one end and having an internal annular recess at the base of said counter-bore provided with intersecting slots extending diametrically across said counter-bored end, and means for locking said ring to said shaft including an expanding ring segment seated in said recess and having outwardly and inwardly extending tongues, the said outwardly extending tongue fitting into one of said slots and the inwardly extending tongue engaging the groove in said seat.

3. In a device of the character described, the combination of a shaft having a seat provided with a groove, a hub member mounted upon said seat, said hub member having a groove adapted to be aligned with the groove in said seat, a key engageable in said grooves for keying said hub member to said shaft, and coupling means for drawing said hub member on said seat, said means including a ring threaded on said shaft adjacent said seat, said ring having an internal annular recess, and an expanding ring segment seated in said recess and having a portion extending into the groove in said shaft for locking said ring to said shaft.

In testimony whereof, I have hereunto affixed my signature.

E. ESTAY CULBERTSON.